United States Patent [19]

Granzow et al.

[11] Patent Number: 4,775,231
[45] Date of Patent: Oct. 4, 1988

[54] MIRROR STRUCTURE WITH PRIMARY REFLECTOR MOUNTED ON STUB BARS AND SECONDARY SIDE REFLECTORS

[75] Inventors: Clarence E. Granzow, P.O. Box 1772, Wickenburg, Ariz. 85358; Arnold L. Gilson, Scottsdale, Ariz.

[73] Assignee: Clarence E. Granzow, Wickenburg, Ariz.

[21] Appl. No.: 53,700

[22] Filed: May 26, 1987

[51] Int. Cl.⁴ .......................... G02B 5/08; G02B 7/18; A47G 1/04
[52] U.S. Cl. ...................................... 350/615; 350/620
[58] Field of Search .................. 350/615, 621; 248/486

[56] References Cited

U.S. PATENT DOCUMENTS

| | | | |
|---|---|---|---|
| 381,452 | 4/1888 | Wiederer | 350/615 |
| 500,310 | 6/1893 | Willard | 350/615 |
| 1,088,764 | 3/1914 | Booth | 350/615 |
| 3,771,854 | 11/1973 | Roark | 350/615 |
| 4,396,249 | 8/1983 | Aisley | 350/615 |

FOREIGN PATENT DOCUMENTS

| | | | |
|---|---|---|---|
| 329694 | 8/1903 | France | 350/615 |
| 769001 | 8/1934 | France | 350/615 |

Primary Examiner—Jon W. Henry
Attorney, Agent, or Firm—Charles E. Cates; James H. Phillips; Richard G. Harrer

[57] ABSTRACT

A foldable mirror structure for providing self-observation reflective images from any desired position about a user. The mirror structure includes a main frame with a primary reflector mounted centrally thereon for pivotable movement between forwardly facing, right angular facing and left angular facing attitudes. Right and left hand secondary reflectors are coupled to the opposite sides of the frame by coupling frames and are pivotably movable between folded and extended positions.

15 Claims, 3 Drawing Sheets

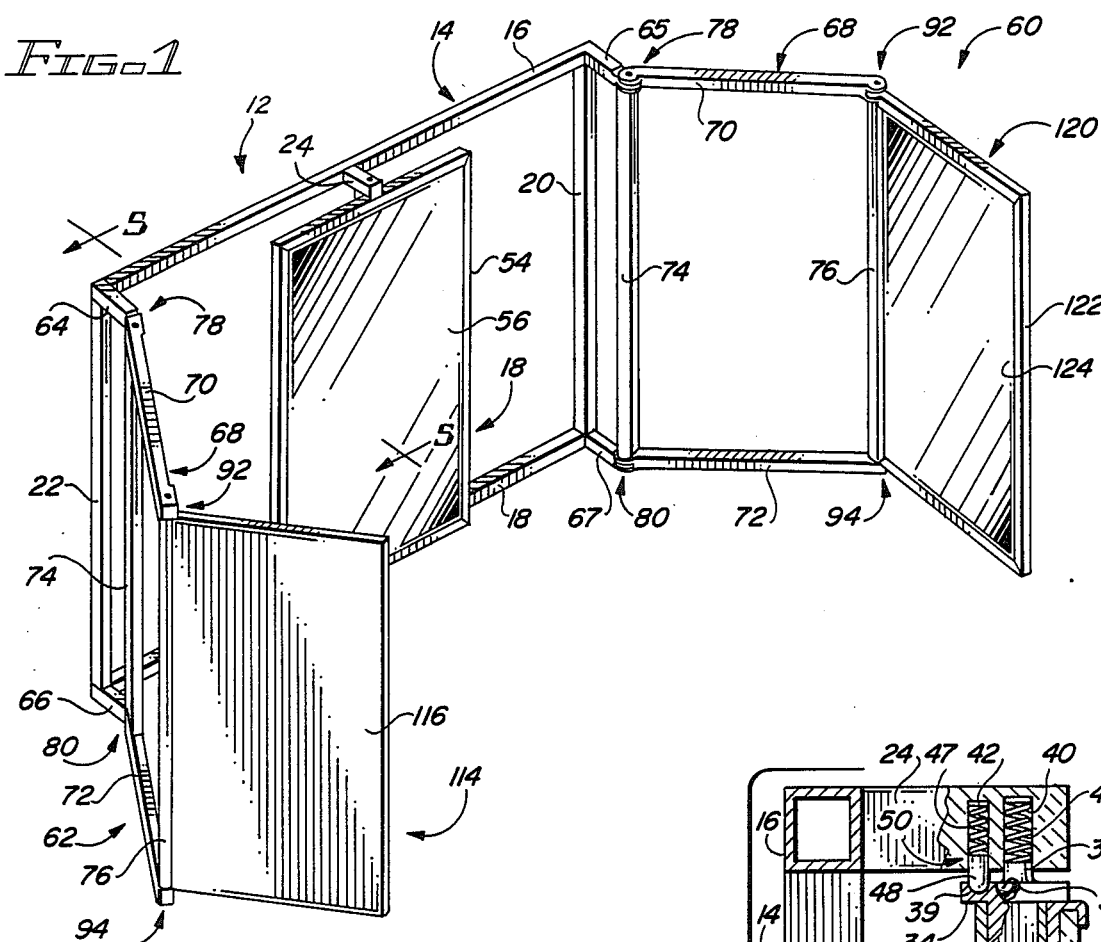
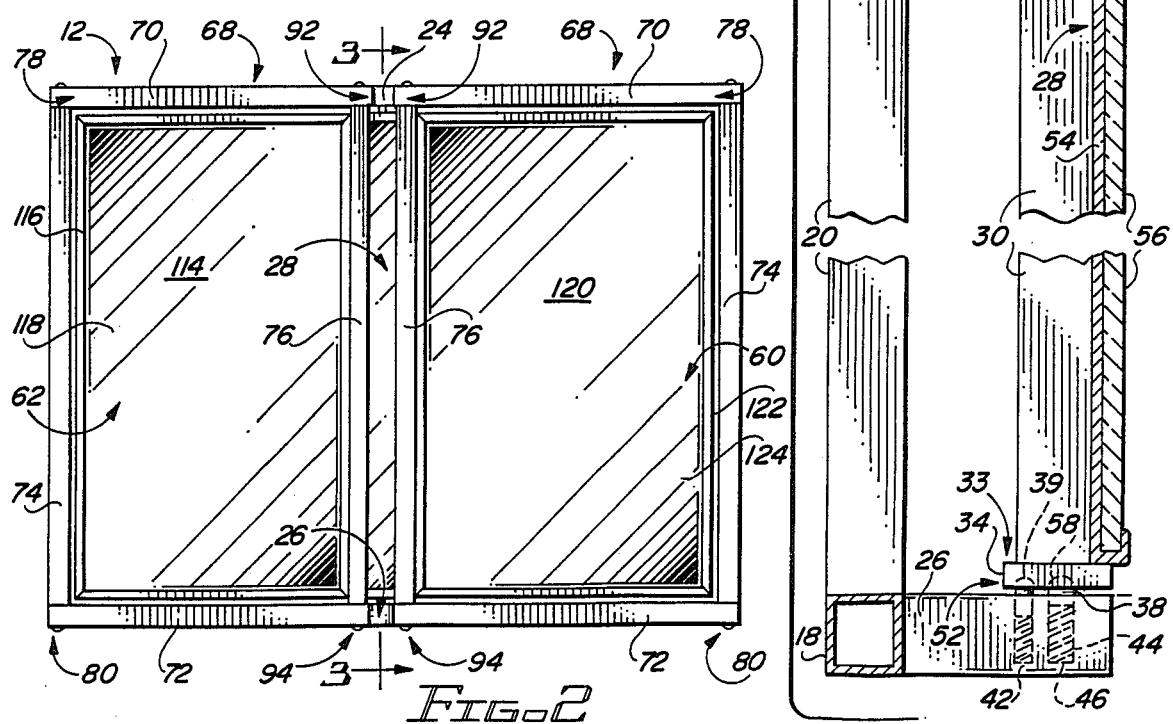

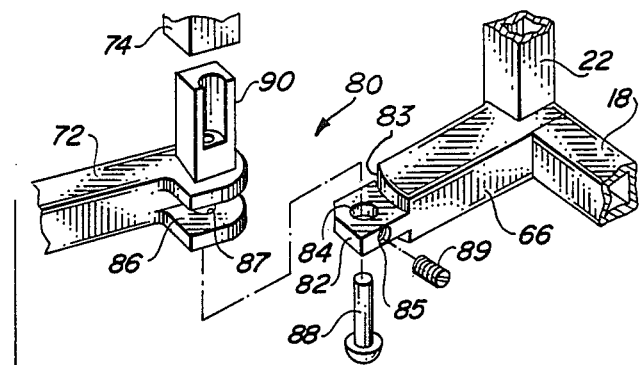
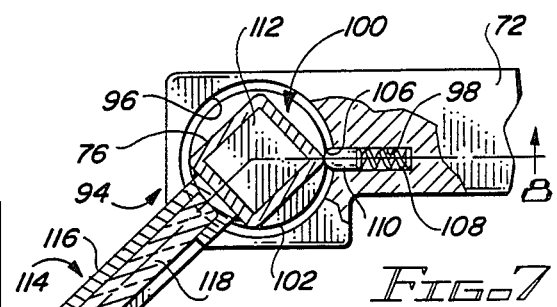
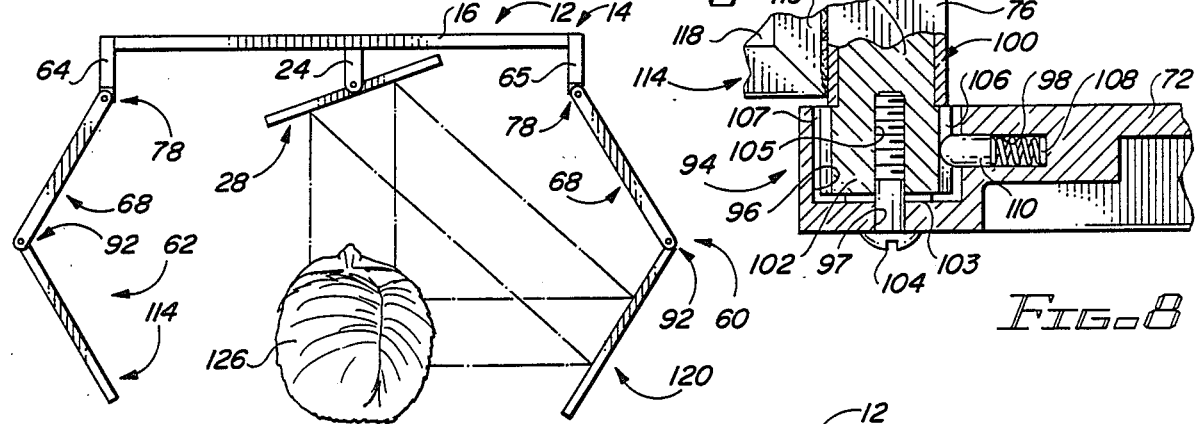
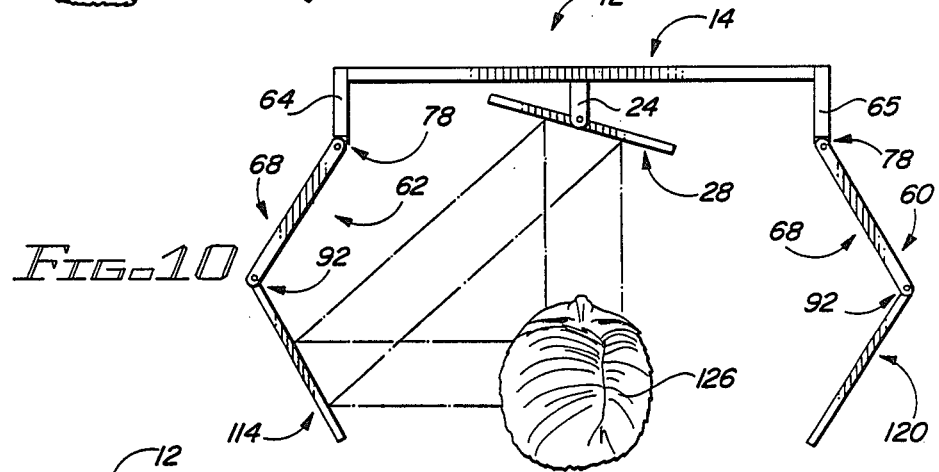
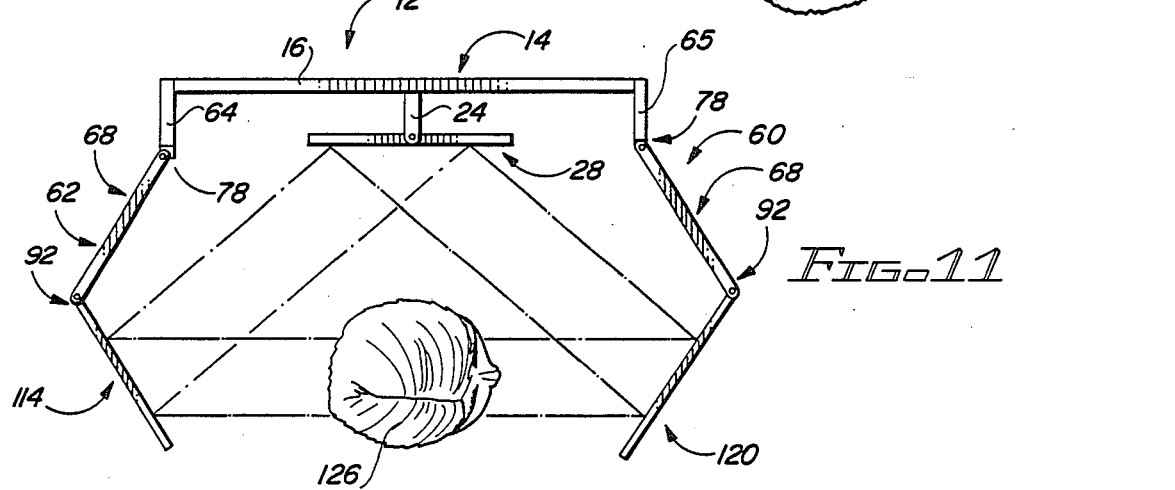

MIRROR STRUCTURE WITH PRIMARY REFLECTOR MOUNTED ON STUB BARS AND SECONDARY SIDE REFLECTORS

BACKGROUND OF THE INVENTION

1. Field of the Invention

This invention relates in general to mirrors and more particularly to a mirror structure which is adjustably positionable to allow a user to selectively achieve self-observation reflected images from any position in a full 360° range about the user.

2. Description of the Prior Art

Most mirrors of the type used for self-observation for the purpose of hair grooming, the application of cosmetics, and the like, are in the form of a single planar reflective surface which provides the viewer with a reflected frontal image. While this is adequate for some purposes, it leaves much to be desired for other purposes such as hair grooming. In an attempt to overcome the shortcoming of using only a frontal reflected image, some users resort to the use of as second hand-held mirror in conjunction with the standard, or primary mirror. The combined use of the primary mirror which provides the reflected frontal image, and the hand-held secondary mirror is awkward at best in that the hand which holds the secondary mirror cannot be used for any other purpose. Also, it is difficult to achieve the desired relative positions of the primary mirror, the user and the secondary mirror, and even when achieved, the reflected images achievable are limited by the position of the user's head between the two reflective surfaces.

Multiple reflective image mirrors are known wherein a primary mirror is flanked by a pair of oppositely and angularly extending secondary mirrors. The secondary mirrors are in juxtaposed relationship with different ones of the opposed vertical side edges of the primary mirror and are usually attached thereto by a hinge arrangement. While this particular type of prior art mirror structure does allow free use of a user's hands for other purposes, like the hand-held secondary mirror discussed above, the reflected images achievable with mirror structures are limited.

To the best of my knowledge, no prior art mirror structures have been devised or suggested which allows self-observation of a user by providing selectively available reflected images of the user from any angle within a full range of 360° about the user.

SUMMARY OF THE INVENTION

In accordance with the present invention, a new and improved mirror structure is disclosed which allows self-observation of a user by providing selectively available reflected images of the user from any desired angle within a full range of 360 °about the user.

The mirror structure of the present invention includes a four-sided planar frame for mounting in a vertical attitude such as by attachment to a wall, supporting thereof on a table top, or the like, a primary reflector of planar configuration is mounted centrally in the frame and has a normal position wherein it lies in a plane that is parallel with the plane of the frame and is pivotably movable and angular positions in either direction about a vertical pivot axis. A pair of secondary reflectors of planar configuration are each coupled to a different one of the vertical sides of the frame by a pair of coupling means. Each of the coupling means includes a spaced apart pair of swing arms having their proximal ends pivotably connected to the upper and lower ends respectively of the vertical side of the frame and the secondary reflectors are pivotably carried between the distal ends of their respective pair of swing arms.

The pivotable mounting of the swing arms and the secondary reflectors permits the mirror structure to be moved between a folded position and an extended position. In the folded position, secondary reflectors are disposed between their respective pair of swing arms, and the swing arms are disposed so as to lie in a plane which is parallel to the frame and overlays the primary reflector. In the folded position, the secondary reflectors face away from the frame which allows the mirror structure to be used in the same manner as a conventional mirror without the necessity of moving the mirror structure from its folded position to its extended position. Thus, in the folded position, the mirror structure of the present invention provides a conventional frontal reflected image of a user.

To provide a full range of self-observation, the swing arms are pivotably moved from the above-described folded position into an extended position thereof wherein the swing arms define an obtuse angle with respect to the plane of the frame, and the secondary reflectors are similarly pivotably moved to the extended positions thereof wherein they define an obtuse angle with their respective swing arms.

When in the fully extended position, a viewer located between the two secondary reflectors, will achieve a full right side reflected image by looking at the primary reflector which has been pivotably moved to the right angular position thereof. A full left side reflected image is achieved by a viewer looking at the primary reflector which has been pivotably moved to the left angular position thereof. A full back reflected image can be achieved by a viewer looking at either one of the secondary reflectors with the primary reflector being in its normal position. Various combinations of reflector orientation, viewer's head positioning and rotation can be used to achieve reflected images from any desired angle within a full range of 360° about the user.

In that full right and left side and full back reflected images in addition to the customary frontal view, are the most useful for self-observation, the mirror structure of the present invention is provided with stop means which determine and locate the extended positions of the swing arms, the secondary reflectors and the normal position of the primary reflector. Therefore, when a user moves the mirror structure to its extended position, the swing arms and the secondary reflectors will automatically move to their ideal obtuse angular orientation to achieve the desired side and back views.

Accordingly, it is an object of the present invention to provide a new and improved mirror structure achieving hands-free self-observation reflected images of a user from any desired angle about the user.

Another object of the present invention is to provide a new and improved mirror structure for achieving hands-free self-observation reflected images of a user from any desired angle within a full range of 360 °about the user.

Another object of the present invention is to provide a new and improved mirror structure having a folded position wherein the mirror structure is usable to provide a full frontal reflected image of a user.

Another object of the present invention is to provide a new and improved mirror structure having an extended position wherein the mirror structure is usable to provide hands-free self-observation reflected images of a user from any desired angle about the user.

Another object of the present invention is to provide a mirror structure of the above described character which includes a four-sided frame having a primary reflector pivotably mounted in its center and having a pair of secondary reflectors extensibly coupled by swing arm means to different ones of the vertical side of the frame.

Another object of the present invention is to provide a mirror structure of the above described character wherein the swing arm means has proximal ends pivotably coupled to the frame for movement to an extended position wherein the swing arm means defines an obtuse angle with respect to the plane of the frame. The secondary reflectors are pivotably mounted between the distal ends of the swing arm means for movement to an extended position wherein the secondary reflectors define an obtuse angle with respect to their respective swing arm means.

Another object of the present invention is to provide a mirror structure of the above described type which includes stop means for determining and locating the swing arm means and the secondary reflectors in the ideal extended positions to provide a user with full side and full back reflected images for self-observation purposes.

The foregoing and other objects of the present invention as well as the invention itself, may be more fully understood from the following description when read in conjunction with the accompanying drawings.

BRIEF DESCRIPTION OF THE DRAWINGS

FIG. 1 is a perspective view of the mirror structure of the present invention in its extended position.

FIG. 2 is a front elevational view of the mirror structure of the present invention in its folded position.

FIG. 3 is an enlarged fragmentary sectional view taken along the line 3—3 of FIG. 2.

FIG. 6 is a fragmentary exploded perspective view of a typical one of the pivot joints which connect the proximal ends of the swing arms to the frame.

FIG. 7 is an enlarged fragmentary sectional view taken along the line 7—7 of FIG. 5.

FIG. 8 is a fragmentary sectional view taken along the line 8—8 of FIG. 7.

FIGS. 9, 10 and 11 are diagrammatic top views illustrating some of the uses of the mirror structure of the present invention.

DESCRIPTION OF THE PREFERRED EMBODIMENT

Figure 4:
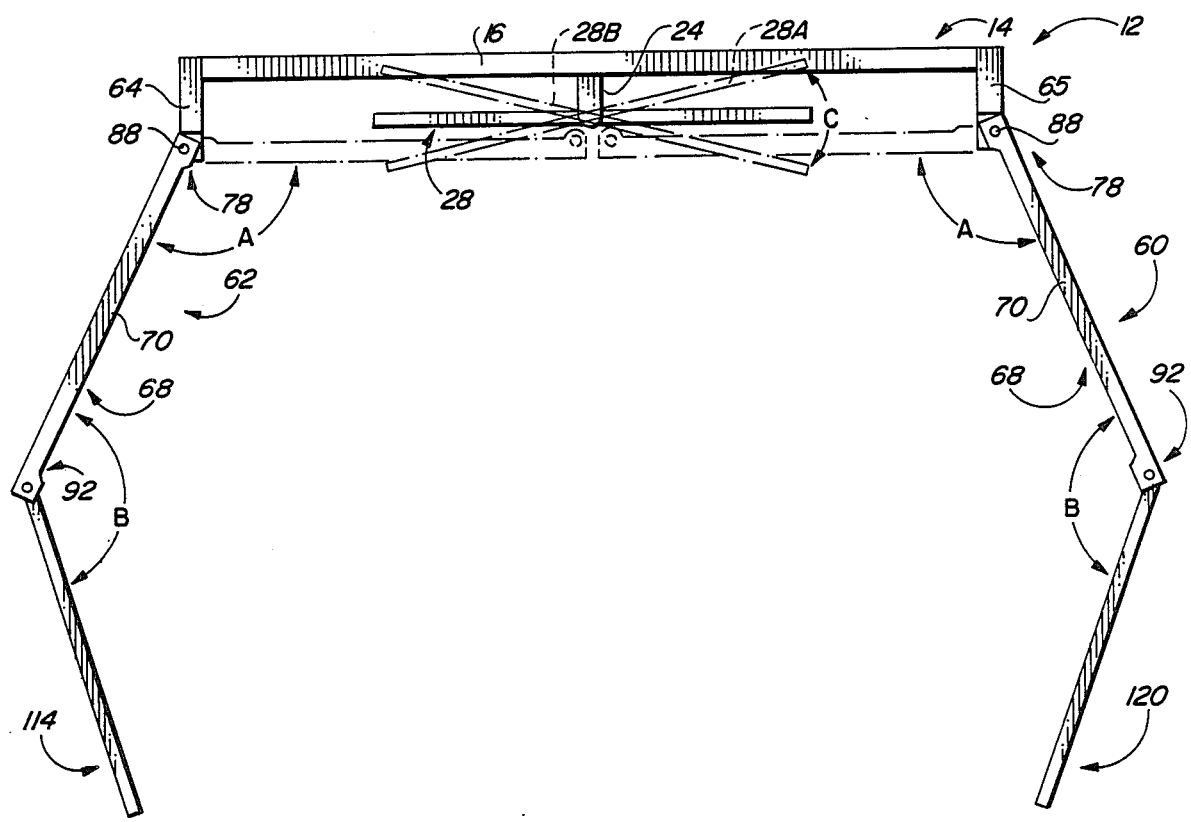
FIG. 4 is a top view of the mirror structure of the present invention.
Figure 5:
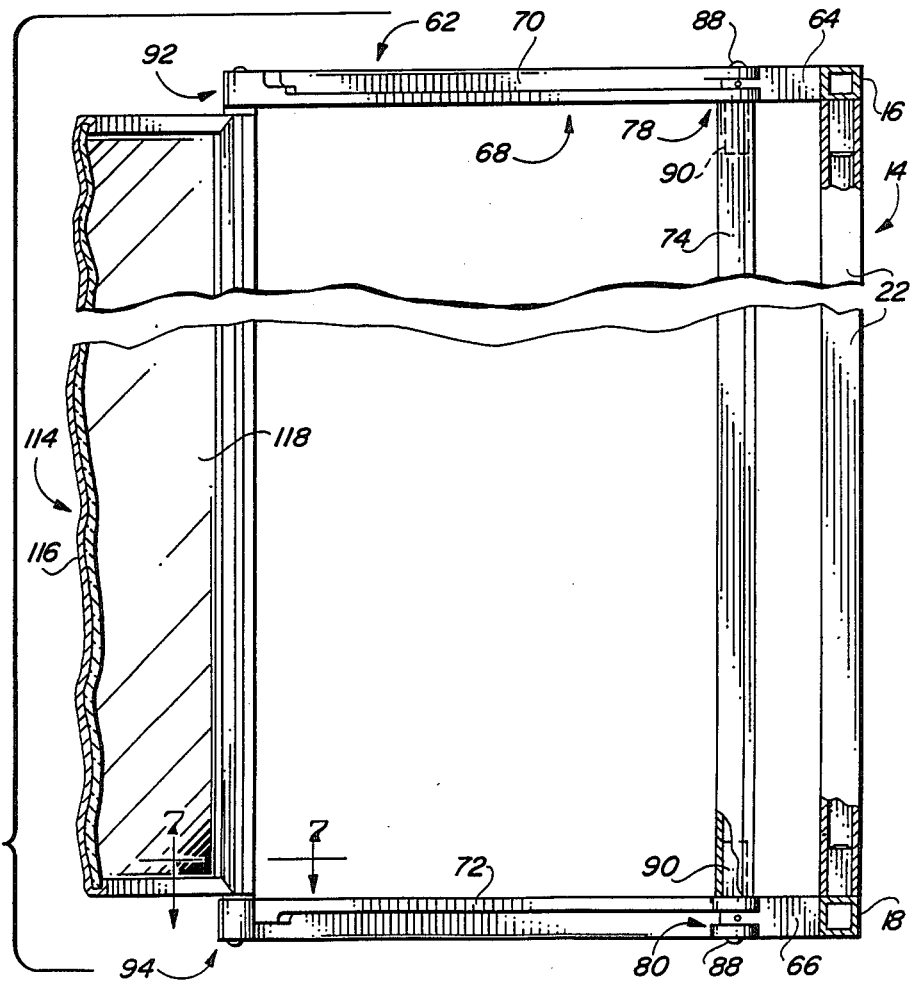
FIG. 5 is an enlarged sectional view taken along the line 5—5 of FIG. 1.

Referring more particularly to the drawings, FIG. 1 best shows the mirror structure of the present invention which is indicated in its entirety by the reference numeral 12.

The mirror structure 12 includes a main frame 14 of equiangular quadrilateral configuration which may be square or in the illustrated rectangular shape. The frame 14 is intended to be positioned in a vertical attitude such as by being mounted on a wall (not shown), supported on a table top (not shown), or the like. The main frame 14 includes a top rail 16, a bottom rail 18, a right side rail 20 and a left side rail 22 which cooperatively define a single plane of the frame 14.

A top stub bar 24 extends normally from between the opposite ends of top rail 16 of the frame 14 and a bottom stub bar 26 extends similarly from the bottom rail 18 of the frame 14. A primary reflector 28 is pivotably mounted between the extending ends of the stub bars 24 and 26, as shown best in FIG. 3.

A pivot rod 30 of tubular configuration, extends between the stub bars 24 and 26 and has mounting fittings 32 and 33 at its opposite ends. The fittings 32 and 33 are similar to each other, therefore the following description and mounting of the fitting 32 will be understood to also apply to the other fitting 33. The fitting 32 includes a plate 34 with a boss 35 extending normally from one surface thereof for insertion into the bore 36 of the pivot rod. A pin 38 extends normally from the opposite surface of the plate 34 and that same surface has at least one dimple 39 formed therein. The top stub bar 24 has a pair of blind bores 40 and 42 formed therein with the pin 38 being received in the bore 40. Biasing means in the preferred form of a compression spring 43 is disposed in the bore 40 which, in conjunction with its counterpart 44 located in the blind bore 46 of the bottom stub bar 26, provides a balanced mounting of the pivot rod 30 between the two stub bars 24 and 26. The second blind bore 42 of the top stub bar 24 has a compression spring 47 mounted therein for yieldably urging a plunger 48 into bearing engagement with the plate 34 of the mounting fitting 32. The spring-loaded plunger 48 and the dimple 39 of the plate 34 provide a detent means 50 at the upper end of the pivot rod 30 and an identical detent means 52 is provided at the lower end of the pivot rod 30 for reasons which will hereinafter be described in detail. The pins 38 of the mounting fittings 32 and 33 extend oppositely from the pivot rod 30 and are in axial alignment with each other to define a vertical pivot axis about which the rod 30 is pivotably movable. The primary reflector 28 in the form of a conventional mirror backing plate 54 which holds a suitable silvered reflecting glass 56, is mounted fast on the pivot rod 30 for movement therewith.

The primary reflector 28 is pivotably movable, as seen best in FIG. 4, through angle C from a normal position to angularly disposed positions. The normal position, as indicated in solid lines, is wherein the primary reflector 28 lies in a plane which is spaced forwardly of the plane of the frame 14 and is parallel therewith. The above-described detent means 50 and 52 including the plungers 48 and dimples 39, serve as locators, or stops which inherently stop the pivotable movement of the primary reflector in its normal position. The primary reflector 28 is pivotably movable into a right hand angular orientation as indicated by dashed lines 28A and into a left hand angular position as indicated in dashed lines 28B. The exact angular positions of the primary reflector 28 can be determined by providing additional dimples 58 in the plates 34 of the mounting fittings 32 and 33 which interact with the plungers 48 to locate the angular position.

The mirror structure 12 further includes a right hand secondary reflector assembly 60 and a left hand secondary reflector assembly 62, with these assemblies being similar to each other. Due to the similar nature of the right and left hand secondary reflector assemblies 60 and 62, the following detailed description of the left hand assembly 62 will be understood to also apply to the right hand assembly 60.

The frame 14 is provided with a pair of top stub bars 64 and 65 each of which is located at a different top corner of the frame 14 and extends normally from the plane of the frame. A pair of bottom stub bars 66 and 67 are each provided at a different lower corner of the frame 14 and extend normally from the frame in the same manner as the top stub bars 64 and 65.

The left hand secondary reflector assembly 62 includes an open coupling frame 68 which is pivotably mounted on the top and bottom stub bars 64 and 66 of the frame 14. The coupling frame 68 includes an upper swing arm 70 and a lower swing arm 72 with a tubular inner vertical rod 74 extending between the aligned proximal ends of the swing arms 70 and 72 and a tubular outer vertical rod 76 extending between the distal ends of the swing arms 70 and 72.

The proximal ends of the upper and lower swing arms 70 and 72 are of special configuration and cooperate with the extending ends of the top and bottom stub bars 64 and 66 to form special pivot joint structures 78 and 80 which pivotably connects the open coupling frame 68 to the stub bars 64 and 66 of the frame 14. The pivot joints 78 and 80 are identical and the joint 80 is seen best in FIG. 6. The stub bar 66 has a tongue 82 of reduced thickness extending from its end with a stop shoulder 83 at the innermost end of the tongue. The tongue 82 has an aperture 84 formed therethrough and an internally threaded bore 85 which intersects the aperture 84. The proximal end of the lower swing arm 72 is provided with a laterally extending clevis 86 with an aperture 87 which aligns with the aperture 84 of the tongue 82 when the clevis is assembled thereon. A pivot pin 88 is carried in the aligned apertures 84 and 87 of the tongue and clevis 82 and 86, respectively, and the pivot pin 88 is fixed against axial and rotational movement by a set screw 89 that is carried in the threaded bore 85 of the tongue 82. The proximal end of the lower swing arm 72 is also provided with a boss 90 which extends normally therefrom for insertion into the lower end of the inner vertical rod 74 of the coupling frame 68.

As will hereinafter be described in detail, the pivot pin 88 of the lower pivot joint 80, and its corresponding pin 88 of the upper pivot joint 78 define a pivot axis about which the open coupling frame 68 is pivotably movable between a folded position and an extended position, with the proximal ends of the swing arms 70 and 72 interacting with the stop shoulders 83 of the stub bars 64 and 66 to limit the movement of the coupling frame 68 and thereby define the extended position thereof.

The outer vertical tubular rod 76 is mounted for pivotable movement between the distal ends of the swing arms 70 and 72 by special pivot joints 92 and 94 which connect the upper and lower ends of the vertical rod 76 to the swing arms. The special pivot joints 92 and 94 are of identical configuration and the following description of the joint 94 shown in FIGS. 7 and 8, will also apply to the other special joint 92.

FIGS. 7 and 8 show the distal end of the lower swing arm 72 as having an upwardly opening blind socket 96 formed therein with an axial aperture 97 being formed through the bottom of the socket. For reasons which will be described below, the distal end of the swing arm 72 also has a blind bore 98 which opens radially into the socket 96. A special stub shaft 100 having a cylindrical base 102 is mounted for axial rotation in the socket 96. The base 102 of the stub shaft 100 rests on a friction washer 103 that is located in the bottom of the socket 96 and a threaded fastener such as the illustrated screw 104, passes upwardly through the axial aperture 97 into the threaded engagement with an internally threaded bore 105 that is formed axially in the stub shaft 100. The cylindrical base 102 of the stub shaft 100 is provided with two grooves 106 and 107 which extend axially of the cylindrical base and open onto its peripheral surface. A compression spring 108 is provided in the bottom of the radial bore 98 of the swing arm 72 for yieldably urging a plunger 110 into bearing engagement with the peripheral surface of the cylindrical base 102 of the stub shaft 100.

The spring-loaded plunger 110 and the two grooves 106 and 107 form a detent means which define two predetermined positions of pivotable movement of the outer vertical rod 76 as will hereinafter be described in detail.

In addition to the cylindrical base 102, the stub shaft 100 is provided with an axially extending boss 112 of square cross section for positioning in the lower end of the outer tubular vertical rod 76. Therefore, the outer vertical rod 76 is pivotably movable about its longitudinal axis by virtue of the special upper and lower pivot joints 92 and 94.

The left hand secondary reflector assembly 62 further includes a left hand, secondary reflector 114 which is in the form of a conventional mirror backing plate 116 which may be integrally formed with the outer vertical rod 76 of the carrier frame 68 or may be suitably attached thereto such as by welding as shown best in FIGS. 7 and 8. In either case, the mirror backing plate 116 is pivotably movable with the outer vertical rod 76 and carries a suitably silvered reflective glass 118. The right hand secondary reflector assembly 60 similarly includes a right hand secondary reflector 120 which includes a backing plate 122 and reflective glass 124 and is pivotably movable with the outer vertical rod 76 of its open carrier frame 68 in the same manner as the left hand secondary reflector assembly 62.

The right and left hand secondary reflector assemblies 60 and 62 are movable between folded positions and extended positions. As shown best in FIG. 4, wherein the two assemblies are shown in solid lines in the extended positions, the right and left hand secondary reflectors 120 and 114, respectively, are pivotably movable through an angle of rotation indicated by the angle B. In the extended solid line positions of the right and left hand secondary reflectors 114 and 120, they are disposed to form obtuse angles with respect to their open coupling frames 68. The exact angle B is not critical in that it may vary as a result of the proportions of the various components which form the mirror structure 12. For example, the length of the stub bars 64, 65, 66 and 67 which determine the locations of the pivot axes about which the coupling frames are pivotably movable, can change the angle B. In the proportions shown in the drawings, a suggested obtuse angle B of approximately 140° has been found to work quite well.

Pivotable movement of the right and left hand secondary reflectors 120 and 114 from their extended positions through the rotation angles B will place the secondary reflectors 120 and 114 in their folded positions. In the folded positions of the right and left hand secondary reflectors 120 and 114, they will be disposed in the opening defined by their respective open coupling frames 68 and thus be in the same planes as their coupling frames.

The open coupling frames 68 of the right and left hand secondary reflector assemblies 60 and 62 are also pivotably movable in the manner hereinbefore described, between extended and folded positions. In the extended solid line positions (FIG. 4) of the coupling frames 68 of the assemblies 60 and 62, the coupling frames 68 are disposed to form an obtuse angle A with respect to their folded positions which are indicated by dashed lines in FIG. 4. As was the case with obtuse angle B, the exact obtuse angle B is not critical, but in the proportions of the illustrated components which form the mirror structure 12, a suggested obtuse angle A of approximately 115° has been found to work quite well.

Pivotable movement of the coupling frames 68 of the right and left hand secondary reflector assemblies 60 and 62 toward each other through the rotation angles A will place the coupling frames 68, and thus the folded secondary reflectors 120 and 114, in the fully folded position of the mirror structure 12. In this fully folded position, the right and left hand secondary reflector assemblies 60 and 62 will lie in a plane which is spaced forwardly of the plane of the frame 14 and is parallel therewith.

When in the fully folded position, the right and left hand secondary reflectors 120 and 114 will face away from the frame 14, i.e., forwardly as shown best in FIG. 2. Therefore, when folded, the mirror structure 12 will provide a frontal reflected image of a viewer in the manner of a conventional mirror without the need for moving the mirror structure to its extended position.

When the mirror structure is moved to its extended position, a full range of reflected images is available to a view, as indicated in FIGS. 9, 10 and 11.

FIG. 9 shows a user's head 126 as being located intermediate the right and left hand secondary reflectors 120 and 114 and facing the primary reflector 28. With the primary reflector 28 pivotably moved to the right hand angular position, the primary reflector 28 in conjunction with the right hand secondary reflector 120 will provide the user with a reflected image of the right side of his or her head 126.

FIG. 10 shows the user's head 128 in exactly the same position as in FIG. 9, but shows the primary reflector 28 as being tilted to its left hand angular position. When the primary reflector 28 is in this left hand position, it cooperates with the left hand secondary reflector 114 to provide the user with a reflected image of the left side of his or her head.

FIG. 11 shows the user's head 128 as having been turned 90° to the right so as to face the right hand secondary reflector 120. With the primary reflector 28 being in its normal position and the user looking at the right hand secondary reflector 120, or alternatively at the left hand secondary reflector 114, all three of the reflectors 28, 114, 120 interact to provide the viewer with a reflected image of the back of his or her head 126.

It will be appreciated that by selective movements of the various reflectors 28, 114 and 120, and/or with movements of the user's head 126, the user is able to receive reflected images from anywhere within a full range of 360° about his or her head.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What is claimed is:

1. A mirror for providing self-observation reflected images from any position about a user comprising:
   (a) a main frame of equiangular configuration defining a plane and having spaced apart top and bottom rails and spaced apart right and left hand rails, said rails cooperatively defining an opening;
   (b) a stub bar extending normally from each of said top and bottom rails and intermediate the opposite ends of said rails;
   (c) a primary reflector means mounted to said stub bars and being selectively pivotably moveable from a normal position wherein it lies in a plane parallel to the plane of said main frame to a right hand angular position and a left hand angular position; and
   (d) a pair of secondary reflector assemblies each coupled to a different one of the side rails of said main frame, each of said pair of secondary reflector assemblies including,
   I. a coupling frame defining an opening and having a proximal edge coupled to one of the side edges of said main frame for pivotable movement from a folded position wherein said coupling frame is in a plane which is parallel to the plane of said main frame to an extended position wherein said coupling frame forms an obtuse angle with respect to the folded position thereof,
   II. a secondary reflector coupled to the distal side of said coupling frame for pivotable movement from a folded position within the opening defined by said coupling frame to an extended position wherein said secondary reflector forms an obtuse angle with respect to said coupling frame.

2. A mirror as claimed in claim 1 further comprising a pivot bar extending from the distal ends of said stub bars with fitting means on the opposite ends of said pivot bar for coupling said pivot bar to said stub bars for pivotable movement about the longitudinal axis of said pivot bar and with said primary reflector attached to said pivot bar for movement therewith and having a reflective glass which faces away from said main frame.

3. A mirror as claimed in claim 2 and further comprising cooperating elements of a detent means in at least one of said stub bars and at least one of said fitting means for locating and releasably holding said primary reflector in its normal position.

4. A mirror as claimed in claim 2 and further comprising cooperative elements of a detent means in at least one of said stub bars and in at least one of said fitting means for locating and releasably holding said primary reflector in each of its normal, right hand and left hand angular positions.

5. A mirror as claimed in claim 1 and further comprising:
   (a) first top and bottom stub bars each extending normally from a different one of the opposite ends of the right hand rail of said main frame;
   (b) a first one of said pair of secondary reflector assemblies being coupled to the distal ends of said first top and bottom stub bars;

(c) second top and bottom stub bars each extending normally from a different one of the opposite ends of the left hand rail of said main frame; and (d) a second one of said pair of secondary reflector assemblies being coupled to the distal ends of said second top and bottom stub bars.

6. A mirror as claimed in claim 5 and further comprising:

(a) said coupling frame of said first one of said pair of secondary reflector assemblies having a proximal side which is located at the distal ends of said first top and bottom stub bars;

(b) first joint means pivotably coupling the proximal side of said coupling frame of said first one of said pair of secondary reflector assemblies to said first top and bottom stub bars, said first joint means including means for locating and stopping the pivotable movement of said coupling frame of said first one of said pair of secondary reflector assemblies at the folded and extended positions thereof;

(c) said coupling frame of said second one of said pair of secondary reflector assemblies having a proximal side which is located at the distal ends of said second top and bottom stub bars; and (d) second joint means pivotably coupling the proximal side of said coupling frame of said second one of said pair of secondary reflector assemblies to said second top and bottom stub bars, said second joint means including means for locating and stopping the pivotable movement of said coupling frame of said second one of said pair of secondary reflector assemblies at the folded and extended positions thereof.

7. A mirror as claimed in claim 5 and further comprising:

(a) said coupling frame of said first secondary reflector assembly includes top and bottom swing arms each having a distal end;

(b) a first rod extending between the distal ends of said top and bottom swing arms of said coupling frame of said first secondary reflector assembly;

(c) first joint means connecting said first rod to the distal ends of said top and bottom swing arms of said coupling frame of said first secondary reflector assembly for pivotable movement of said first rod about its longitudinal axis;

(d) said secondary reflector of said first secondary reflector assembly being integral with said first rod for movement therewith;

(e) said first joint means including detent means for locating and releasably holding said secondary reflector of said first secondary reflector assembly in its folded and extended positions;

(f) said coupling frame of said second secondary reflector assembly including top and bottom swing arms each having a distal end;

(g) a second rod extending between the distal ends of said top and bottom swing arms of said coupling frame of said secondary reflector assembly;

(h) second joint means connecting said second rod to the distal ends of said top and bottom swing arms of said coupling frame of said second secondary reflector assembly for pivotable movement of said second rod about its longitudinal axis;

(i) said secondary reflector of said second secondary deflector assembly being integral with said second rod for movement therewith; and (j) said second joint means including detent means for locating and releasably holding said secondary reflector of said second secondary reflector assembly in its folded and extended positions.

8. A mirror for providing self-observation reflected images from any position about a user comprising:

(a) a main frame of equiangular configuration defining a plane and having spaced apart top and bottom rails and spaced apart right and left hand edges, said edges and rails cooperatively defining an opening;

(b) a stub bar extending normally from each of said top and bottom rails and intermediate the opposite ends of said rails;

(c) a primary reflector means mounted to said stub bars and being selectively pivotably moveable from a normal position wherein it lies in a plane parallel to the plane of said main frame to a right hand angular position and a left hand angular position;

(d) first coupling frame defining an opening and having a proximal edge coupled to the right hand side edge of said main frame for pivotable movement from a folded position wherein said first coupling frame is in a plane that is parallel to the plane of said main frame to an extended position wherein said first coupling frame forms an obtuse angle with respect to the folded position thereof;

(e) a first secondary reflector coupled to the distal side of said first coupling frame for pivotable movement from a folded position in the opening of said first coupling frame to an extended position wherein said first secondary reflector forms an obtuse angle with said first coupling frame;

(f) a second coupling frame defining an opening and having a proximal edge coupled to the left hand side edge of said main frame for pivotable movement from a folded position wherein said second coupling frame is in a plane that is parallel to the plane of said main frame to an extended position wherein said second coupling frame forms an obtuse angle with respect to the folded position thereof; and (g) a second secondary reflector coupled to the distal side of said second coupling frame for pivotable movement from a folded position in the opening of said second coupling frame to an extended position wherein said second secondary reflector forms an obtuse angle with said second coupling frame.

9. A mirror as claimed in claim 8 further comprising a pivot bar extending from the distal ends of said stub bars with fitting means on the opposite ends of said pivot bars for coupling said pivot bar to said stub bars for pivotable movement about the longitudinal axis of said pivot bar and with said primary reflector attached to said pivot bar for movement therewith and having a reflective glass which faces away from said main frame.

10. A mirror as claimed in claim 9 and further comprising cooperating elements of a detent means in at least one of said stub bars in at least one of said fitting means for releasably holding said primary reflector in its normal position.

11. A mirror as claimed in claim 9 and further comprising cooperating elements of a detent means in at least one of said top and bottom stub bars and in at least one of said fitting means for releasably holding said primary reflector in each of its normal, right hand and left hand angular positions.

12. A mirror as claimed in claim 8 and further comprising:
  (a) first top and bottom stub bars each extending normally from the top corner and bottom corner at the right hand side of said main frame;
  (b) said first coupling frame being connected to the distal ends of said first top and bottom stub bars;
  (c) second top and bottom stub bars each extending normally from the top corner and bottom corner at the left hand side of said main frame; and
  (d) said second coupling frame being connected to the distal ends of said second top and bottom stub bars.

13. A mirror as claimed in claim 12 and further comprising:
  (a) said first coupling frame having a proximal side which is located at the distal ends of said first top and bottom stub bars;
  (b) first joint means pivotably coupling the proximal side of said first coupling frame to said first top and bottom stub bars, said first joint means including means for locating the folded and extending positions of said first coupling frame and stopping the pivotable movements thereof at those locations;
  (c) said second coupling frame having a proximal side which is located at the distal ends of said second top and bottom stub bars; and
  (d) second joint means pivotably coupling the proximal side of said second coupling frame to said second top and bottom stub bars, said second joint means including means for locating the folded and extended positions of said second coupling frame, and stopping the pivotable movements thereof at those locations.

14. A mirror as claimed in claim 12 and further comprising:
  (a) said first coupling frame includes top and bottom swing arms each having a distal end;
  (b) a first rod extending between the distal ends of said top and bottom swing arms of said first coupling frame;
  (c) first joint means connecting said first rod to the distal ends of said top and bottom swing arms of said first coupling frame for pivotable movement of said first rod about its longitudinal axis;
  (d) said first secondary reflector being integral with said first rod for movement therewith;
  (e) said first joint means including detent means for locating and releasably holding said first secondary reflector in its folded and extended positions;
  (f) said second coupling frame includes top and bottom swing arms each having a distal end;
  (g) a second rod extending between the distal ends of said top and bottom swing arms of said second coupling frame;
  (h) second joint means connecting said second rod to the distal ends of said top and bottom swing arms of said second coupling frame for pivotable movements of said second rod about its longitudinal axis;
  (i) said second secondary reflector being integral with said second rod for movement therewith; and
  (j) said second joint means including detent means for locating and releasably holding said second secondary reflector in its folded and extended positions.

15. A mirror as claimed in claim 8 and further comprising:
  (a) said first secondary reflector having a reflective glass and disposed so that said reflective glass faces away from said main frame when said first secondary reflector and said first coupling frame are both in their folded positions; and
  (b) said second secondary reflector having a reflective glass and disposed so that said reflective glass faces away from said main frame when said second secondary reflector and said second coupling frame are both in their folded positions.

* * * * *